(No Model.)
F. B. GREER.
FLOOD FENCE.
No. 504,346. Patented Sept. 5, 1893.
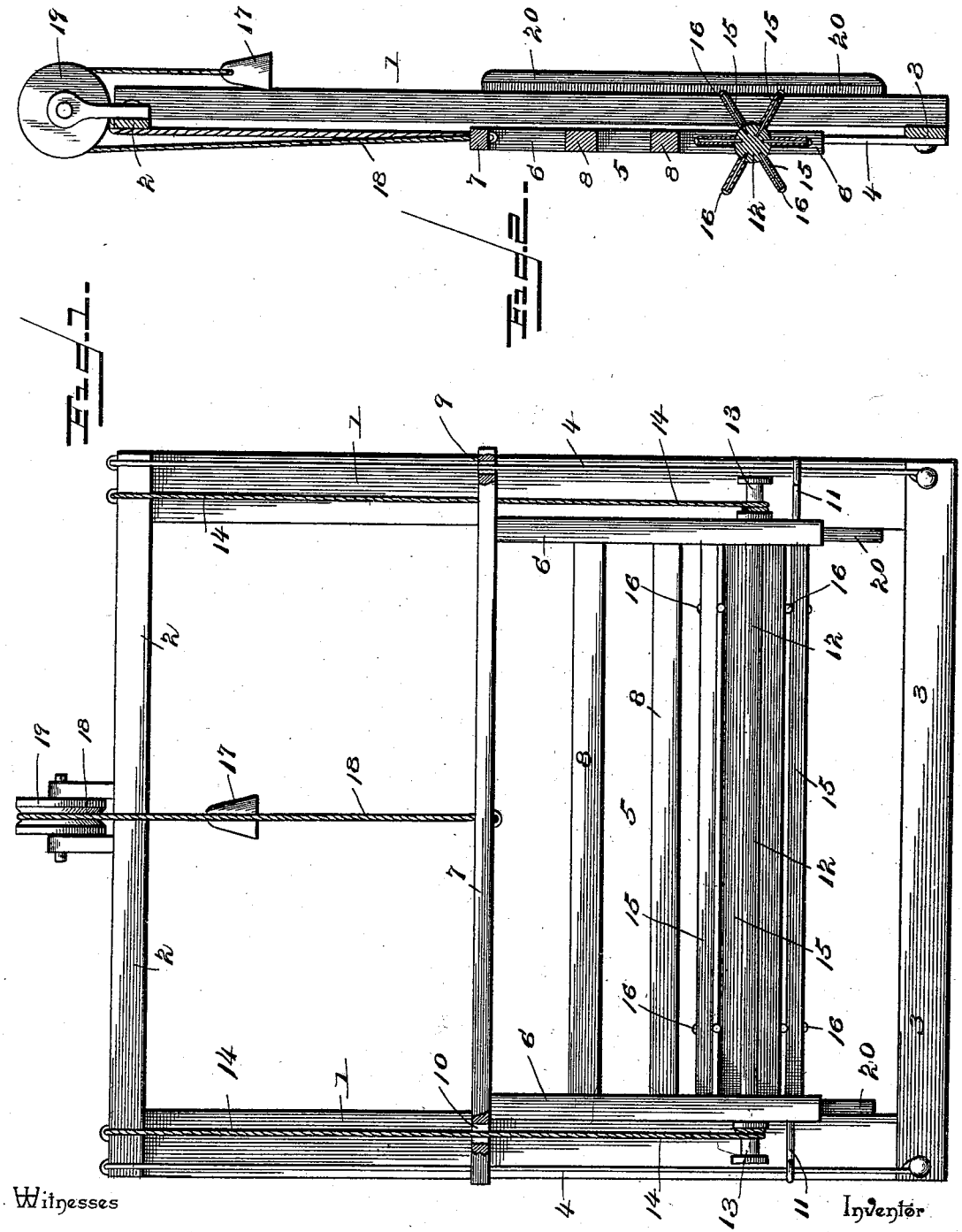
Witnesses
E. K. Stewart
N. W. Riley
Inventor
Francis B. Greer
By his Attorneys,
C. A. Snow & Co.

UNITED STATES PATENT OFFICE.

FRANCIS B. GREER, OF BARNHILL, ILLINOIS.

FLOOD-FENCE.

SPECIFICATION forming part of Letters Patent No. 504,346, dated September 5, 1893.

Application filed May 23, 1893. Serial No. 475,243. (No model.)

*To all whom it may concern:*

Be it known that I, FRANCIS B. GREER, a citizen of the United States, residing at Barnhill, in the county of Wayne and State of Illinois, have invented a new and useful Flood-Fence, of which the following is a specification.

The invention relates to improvements in flood fences.

The object of the present invention is to improve the construction of flood fences and to provide a simple, inexpensive and efficient one, which will readily rise and fall with water, which will permit the passage of drift wood, and the like, and which will effectually exclude animals.

The invention consists in the construction and novel combination and arrangement of parts hereinafter fully described, illustrated in the accompanying drawings and pointed out in the claims hereto appended.

In the drawings—Figure 1 is an elevation of a flood fence constructed in accordance with this invention. Fig. 2 is a vertical sectional view.

Like numerals of reference indicate corresponding parts in both figures of the drawings.

1—1 designate uprights of a supporting frame connected at their ends by top and bottom cross-bars 2 and 3, which support vertical guide rods 4 on which moves a gate 5. The top and bottom cross-bars 2 and 3 are secured to the rear faces of the uprights 1, and they cause the guide-rods, which extend from their rear faces to be separated from and parallel with the uprights, whereby the gate 5 is caused to lie close to, and yet be out of contact with the uprights.

The gate consists of vertical end bars 6 and rails 7 and 8, the former of which is arranged at the top of the gate and extends beyond the same and is provided in each extended portion with openings 9 and 10. The openings 9 receive the guide rods, and the gate is provided at its bottom with outwardly extending eyes 11 receiving the guide rod and having shanks secured to the end bars 6. By this means the gate is caused to move freely and without friction on the guide rods. The cross-bars 8 extend across the middle and the upper portion of the gate, and in the lower portion of the gate is journaled a wheel 12 which is adapted to be rotated by the water which passes beneath the gate. The journals of the wheel 12 extend through the end bar 6, and have mounted on them spools 13 to which are attached the lower ends of cords 14, which are attached to the top of the supporting frame, whereby when the water passing beneath the gate rotates the wheel, the cords will be wound on the spools, thereby automatically raising the gate, and causing it to rise and fall with the water. The cords pass through the openings 10 of the extensions of the top rail 7, and are guided thereby to the spools and are prevented from becoming twisted. The wheel 12 is provided with flexibly mounted blades 15, which are disposed longitudinally of the wheel. The water or paddle wheel 12 by having the flexible blades will permit drift wood to pass readily beneath it without injury to the flood gate. The flexibility of the blades is obtained by resilient pins 16, which secure the blades in position.

The gate is balanced by a weight 17 attached to one end of the cord 18, which passes over a pulley 19, and is secured to the top bar 7 of the gate. The pulley is mounted on the top of the supporting frame, and partially counterbalances the gate to relieve the cords of strain, and to cause the gate readily to fall with the water.

The gate is adapted to be employed at creeks, ravines, ditches, and the like, and it will be readily apparent that it will effectually prevent the passage of animals, and that it will rise and fall with the water and will not cause the accumulation of drift-wood, but will permit the same to pass freely.

The guide-rod and the cords are mounted at the rear side of the supporting frame, and the front of the latter is provided with vertically disposed inwardly extending fenders 20 to prevent drift-wood from striking the sides of the gate.

Changes in the form, proportion and the minor details of construction may be resorted to without departing from the principle or sacrificing any of the advantages of this invention.

What I claim is—

1. In a flood fence, the combination of a supporting frame, a vertically movable gate mounted thereon, a paddle-wheel horizontally journaled at the bottom of the gate and adapted to be rotated by water passing beneath the gate, spools connected with the journals of the wheel, and cords attached to the supporting frame and secured to the spools and adapted to be wound thereon by the rotation of the paddle-wheel, substantially as and for the purpose described.

2. In a flood fence, the combination of a supporting frame provided with vertical guide-rods, a gate having its top bar extended and provided with openings 9 and 10, the openings 9 receiving the guide-rods, eyes attached to the bottom of the gate and receiving the guide rods, a paddle-wheel horizontally journaled at the bottom of the gate, spools connected to the journals of the paddle wheel, cords attached to the top of the supporting frame and passing through the openings 10 and secured to the spools and adapted to be wound around them, a pulley mounted on the supporting frame, and a cord passing over the pulley and provided at one end with a weight and having its other end attached to the gate, substantially as described.

3. In a flood fence, the combination of a supporting frame, a vertically movable gate mounted thereon, a paddle-wheel horizontally journaled at the bottom of the gate and having flexibly mounted blades, spools connected with the journals of the paddle wheel, and cords attached to the supporting frame and to the spool and adapted to be wound around the latter, substantially as described.

4. In a flood fence, the combination of a supporting frame, a vertically movable gate mounted thereon, a paddle-wheel journaled horizontally on the gate at the bottom thereof and arranged below the same, and mechanism connecting the paddle-wheel with the supporting frame, whereby the rotation of the paddle-wheel will raise and lower the gate, substantially as described.

In testimony that I claim the foregoing as my own I have hereto affixed my signature in the presence of two witnesses.

FRANCIS B. GREER.

Witnesses:
T. L. FRESHWATER,
C. S. GRIFFIN.